US008577299B2

(12) United States Patent  
Agrawal et al.

(10) Patent No.: US 8,577,299 B2
(45) Date of Patent: Nov. 5, 2013

(54) WIRELESS COMMUNICATION SYSTEM WITH CONFIGURABLE CYCLIC PREFIX LENGTH

(75) Inventors: Avneesh Agrawal, San Diego, CA (US); Durga Prasad Malladi, San Diego, CA (US); Anastasios Stamoulis, San Diego, CA (US); Ashok Mantravadi, San Diego, CA (US); Ramaswamy Murali, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1204 days.

(21) Appl. No.: 11/144,181

(22) Filed: Jun. 2, 2005

(65) Prior Publication Data

US 2006/0013325 A1    Jan. 19, 2006

Related U.S. Application Data

(60) Provisional application No. 60/577,083, filed on Jun. 4, 2004.

(51) Int. Cl.
 *H04B 1/00* (2006.01)

(52) U.S. Cl.
 USPC .......................... 455/65; 455/63.1; 455/67.13

(58) Field of Classification Search
 USPC ........................ 455/63.1, 65, 67.13
 See application file for complete search history.

(56) References Cited

U.S. PATENT DOCUMENTS

| 4,558,322 A | 12/1985 | Tomasi |
| 4,914,651 A | 4/1990 | Lusignan |
| 5,602,868 A | 2/1997 | Wilson |
| 5,699,363 A | 12/1997 | Wishart et al. |
| 5,867,478 A | 2/1999 | Baum et al. |
| 5,943,344 A | 8/1999 | Keller et al. |
| 6,031,874 A | 2/2000 | Chennakeshu et al. |
| 6,115,354 A | 9/2000 | Weck |

(Continued)

FOREIGN PATENT DOCUMENTS

| CA | 2314404 A1 | 1/2002 |
| CA | 2354196 A1 | 1/2003 |

(Continued)

OTHER PUBLICATIONS

International Search Report—PCT/US05/019543, International Search Authority-European Patent Office, Sep. 27, 2005.

(Continued)

*Primary Examiner* — Raymond S Dean
(74) *Attorney, Agent, or Firm* — Larry J. Moskowitz

(57) ABSTRACT

To transmit data in a manner to mitigate the deleterious effects of delay spread, the expected coverage areas for multiple transmissions to be sent in multiple time slots are initially determined. Cyclic prefix lengths for these transmissions are selected based on the expected coverage areas. The cyclic prefix length for each transmission may be selected from among a set of allowed cyclic prefix lengths based on the expected coverage area for that transmission, the pilot staggering used for the transmission, and so on. For example, a shorter cyclic prefix length may be selected for each local transmission, and a longer cyclic prefix length may be selected for each wide-area transmission. The selected cyclic prefix lengths may be signaled to the terminals. The transmissions are processed (e.g., OFDM modulated) based on the selected cyclic prefix lengths. The cyclic prefix lengths may be selected periodically, e.g., in each super-frame.

33 Claims, 11 Drawing Sheets

(56) References Cited

U.S. PATENT DOCUMENTS

| | | |
|---|---|---|
| 6,208,873 B1 | 3/2001 | Black et al. |
| 6,366,309 B1 | 4/2002 | Siegle |
| 6,470,024 B1 | 10/2002 | Hamalainen et al. |
| 6,529,482 B1 | 3/2003 | Lundby |
| 6,567,375 B2 | 5/2003 | Balachandran et al. |
| 6,594,473 B1 | 7/2003 | Dabak et al. |
| 6,661,771 B1 | 12/2003 | Cupo et al. |
| 6,728,233 B1 | 4/2004 | Park et al. |
| 6,747,948 B1 | 6/2004 | Sarraf et al. |
| 6,788,661 B1 | 9/2004 | Ylitalo et al. |
| 6,795,419 B2 | 9/2004 | Parantainen et al. |
| 6,842,487 B1 | 1/2005 | Larsson |
| 6,853,629 B2 | 2/2005 | Alamouti et al. |
| 6,885,630 B2 | 4/2005 | Kostic et al. |
| 6,909,702 B2 | 6/2005 | Leung et al. |
| 6,927,728 B2 | 8/2005 | Vook et al. |
| 6,940,824 B2 | 9/2005 | Shibutani |
| 6,940,827 B2 | 9/2005 | Li et al. |
| 6,961,388 B2 | 11/2005 | Ling et al. |
| 6,999,467 B2 | 2/2006 | Krauss et al. |
| 7,027,523 B2 | 4/2006 | Jalali et al. |
| 7,099,270 B2 | 8/2006 | Yamaguchi |
| 7,110,387 B1 * | 9/2006 | Kim et al. ............... 370/344 |
| 7,139,237 B2 | 11/2006 | Nangia et al. |
| 7,181,170 B2 | 2/2007 | Love et al. |
| 7,273,869 B2 | 9/2007 | Lindsley et al. |
| 7,280,552 B2 | 10/2007 | Isson |
| 7,292,651 B2 | 11/2007 | Li |
| 7,313,118 B2 | 12/2007 | Geers |
| 7,379,416 B2 | 5/2008 | Yang et al. |
| 7,391,715 B2 | 6/2008 | Lee et al. |
| 7,433,418 B1 | 10/2008 | Dogan et al. |
| 7,436,903 B2 | 10/2008 | Sandhu et al. |
| 7,471,729 B2 | 12/2008 | Miyoshi |
| 7,483,366 B2 | 1/2009 | Joo et al. |
| 7,706,346 B2 | 4/2010 | Huo et al. |
| 7,920,884 B2 | 4/2011 | Agrawal et al. |
| 8,089,855 B2 | 1/2012 | Agrawal et al. |
| 2002/0049859 A1 | 4/2002 | Bruckert et al. |
| 2002/0086691 A1 | 7/2002 | Kostic et al. |
| 2002/0141447 A1 | 10/2002 | Leung et al. |
| 2002/0159422 A1 | 10/2002 | Li et al. |
| 2003/0002450 A1 | 1/2003 | Jalali et al. |
| 2003/0002518 A1 | 1/2003 | Shibutani |
| 2003/0043928 A1 | 3/2003 | Ling et al. |
| 2003/0072255 A1 | 4/2003 | Ma et al. |
| 2003/0074476 A1 | 4/2003 | Kim et al. |
| 2003/0081538 A1 | 5/2003 | Walton et al. |
| 2003/0112744 A1 | 6/2003 | Baum et al. |
| 2003/0137926 A1 | 7/2003 | Joo et al. |
| 2003/0152043 A1 | 8/2003 | Geers |
| 2003/0156570 A1 | 8/2003 | Alamouti et al. |
| 2003/0174642 A1 | 9/2003 | Yang et al. |
| 2003/0174645 A1 | 9/2003 | Paratainen et al. |
| 2003/0227866 A1 | 12/2003 | Yamaguchi |
| 2004/0023665 A1 | 2/2004 | Simmonds et al. |
| 2004/0086055 A1 | 5/2004 | Li |
| 2004/0178954 A1 | 9/2004 | Vook et al. |
| 2004/0213145 A1 * | 10/2004 | Nakamura ............... 370/208 |
| 2004/0218607 A1 | 11/2004 | Hurtta et al. |
| 2004/0228294 A1 | 11/2004 | Kim et al. |
| 2005/0014464 A1 | 1/2005 | Larsson |
| 2005/0047481 A1 | 3/2005 | Lyle et al. |
| 2005/0063345 A1 | 3/2005 | Wu et al. |
| 2005/0163258 A1 * | 7/2005 | Gore et al. ............... 375/340 |
| 2005/0207389 A1 | 9/2005 | Shiao et al. |
| 2005/0249177 A1 | 11/2005 | Huo et al. |
| 2005/0276344 A1 | 12/2005 | Ling et al. |
| 2006/0013168 A1 | 1/2006 | Agrawal et al. |
| 2006/0013186 A1 | 1/2006 | Agrawal et al. |
| 2007/0070944 A1 | 3/2007 | Rinne et al. |
| 2007/0189404 A1 | 8/2007 | Baum et al. |
| 2009/0304120 A1 | 12/2009 | Agrawal et al. |

FOREIGN PATENT DOCUMENTS

| | | |
|---|---|---|
| CN | 1363157 A | 8/2002 |
| DE | 4425713 | 7/1995 |
| EP | 0588741 | 3/1994 |
| EP | 0869647 A2 | 10/1998 |
| EP | 1061687 | 12/2000 |
| EP | 1065855 | 1/2001 |
| EP | 1109365 | 6/2001 |
| EP | 1148673 | 10/2001 |
| EP | 1221778 A1 | 7/2002 |
| EP | 1298948 A1 | 4/2003 |
| EP | 1387545 | 2/2004 |
| GB | 2384958 A | 8/2003 |
| GB | 2394871 | 5/2004 |
| JP | 7245574 | 9/1995 |
| JP | H09512156 A | 12/1997 |
| JP | 2000236343 | 8/2000 |
| JP | 2001-511766 | 8/2001 |
| JP | 2001-320346 | 11/2001 |
| JP | 2001-353694 | 12/2001 |
| JP | 2003-018647 | 1/2003 |
| JP | 2003234696 A | 8/2003 |
| JP | 200432380 | 1/2004 |
| JP | 2004064654 A | 2/2004 |
| JP | 2004064793 A | 2/2004 |
| JP | 2004-095445 | 3/2004 |
| JP | 2004096186 | 3/2004 |
| JP | 2004507121 | 3/2004 |
| JP | 2004158901 A | 6/2004 |
| JP | 2004159303 | 6/2004 |
| JP | 2004533746 | 11/2004 |
| JP | 2007-518290 | 7/2007 |
| JP | 2008-502224 | 1/2008 |
| JP | 2008-502225 | 1/2008 |
| KR | 1020040011653 | 2/2004 |
| RU | 2183387 C2 | 6/2002 |
| WO | 9730531 | 8/1997 |
| WO | 9824250 | 6/1998 |
| WO | 9959278 | 11/1999 |
| WO | 0004728 | 1/2000 |
| WO | 0101626 | 1/2001 |
| WO | WO0135537 A2 | 5/2001 |
| WO | 0161899 | 8/2001 |
| WO | 0211317 | 2/2002 |
| WO | 0221715 | 3/2002 |
| WO | 0235735 | 5/2002 |
| WO | WO0251024 A1 | 6/2002 |
| WO | WO02062002 A1 | 8/2002 |
| WO | 02073831 | 9/2002 |
| WO | 02082834 | 10/2002 |
| WO | 03034642 | 4/2003 |
| WO | WO03034645 A1 | 4/2003 |
| WO | WO03047140 A1 | 6/2003 |
| WO | WO03069824 A2 | 8/2003 |
| WO | WO2004036767 | 4/2004 |
| WO | WO2004039011 | 5/2004 |
| WO | WO2004068780 A1 | 8/2004 |
| WO | 2004086711 | 10/2004 |
| WO | 2005004428 | 1/2005 |
| WO | 2005022811 | 3/2005 |
| WO | 2005071867 | 8/2005 |
| WO | 2005122425 | 12/2005 |

OTHER PUBLICATIONS

International Preliminary Report on Patentability—PCT/US05/019543, International Search Authority—IPEA/US-Alexandria, Virginia-Apr. 24, 2006.
Written Opinion—PCT/US05/019543, International Search Authority-European Patent Office-Sep. 27, 2005.
"3rd Generation Partnership Project 2 '3GPP2' CDMA2000 High Rate Packet Data Air Interface Specification," 3GPP2 C.S0024 Version 3.0, Dec. 5, 2001.
3GPP2, CDMA2000 High Hate Packed Data Air Interface Specification, Sep. 12, 2000, sections 7-1 to 7-30.
Alasti et al., "A Discrete Multi Carrier Multiple Access Technique for Wireless Communications." Vehicular Technology Conference, vol. 2, May 18, 1998, pp. 1533-1537. New York, US.

(56) References Cited

OTHER PUBLICATIONS

Dammann et al., "Transmit/Receive-Antenna Diversity Techniques for OFDM Systems." European Transactions on Telecommunications, vol. 13, No. 5. Sep. 2002, pp. 531-538, Milano, IT.

Shaoping Chen et al., "A Space-Time Coding Scheme with Maximum Diversity Gains Over Frequency-Selective Fading Channels." Personal, Indoor and Mobile Radio Communications, vol. 2, Sep. 7, 2003 - Sep. 10, 2003, pp. 2567-2570, Piscataway, NJ.

Weck C., "Coverage Aspects of Digital Terrestrial Television Broadcasting" EBU Review-Technical, European Broadcasting Union, No. 270, Dec. 21, 1996, pp. 19-30, XP000684656 Brussels, BE.

Van Duc Nguyen et al., "Performance of Channel Estimation Using Pilot Symbols for a Coherent OFDM System" International Symposium on Wireless Personal Multimedia Communications, vol. 2, Nov. 12, 2000, pp. 842-847.

"Introduction of Multimedia Broadcast/Multicast Service (MBMS) in the Radio Access Network (RAN)", ETSI-33PP, version 6.1, Jul. 2004, pp. 1-52.

International Search Report and Written Opinion—PCT/US05/019529, International Search Authority-European Patent Office, Oct. 11, 2005.

International Search Report and Written Opinion—PCT/US05/019541, International Search Authority-European Patent Office, Sep. 28, 2005.

International Search Report and Written Opinion—PCT/US05/019542, International Search Authority-US, Oct. 5, 2005.

International Search Report and Written Opinion—PCT/US05/019544, International Search Authority-European Patent Office, Dec. 12, 2005.

3GPP TSG RAN WG2 #41, R2-040416, LG Electronics Inc.:"MCCH Scheduling," pp. 1-3, Malaga, Spain Feb. 16-20, 2004.

Taiwan Search Report—TW094118504—TIPO—Feb. 21, 2012.

Siemens, "Advanced interleaver for outer coding in MBMS (FDD)", 3GPP TSG-RAN WG1 Rel.6 Ad hoc, R1-040072, Jan. 2004 URL: http://www.3gpp.org/ftp/tsg_ran/WG1_RL1/TSGR1_AH/Rel-6_Ad_Hoc/Docs/Zips/R1-040072.zip (JP-N6-10-031375).

Siemens, "Outer Coding Performance for MBMS (FDD)", 3GPP TSG-RAN WG#34, R1-031017, Oct. 2003 URL: http://www.3gpp.org/ftp/tsg_ran/WG1_RL1/TSGR1_34/Docs/Zips/R1-031017.zip (JP-N6-10-031372).

Ojanpera, T. et al., "Frames—Hybrid Multiple Access Technology," IEEE International Symposium on Spread Spectrum Techniques and Applications, No. 1, Sep. 22, 1996, pp. 320-324.

Co-pending U.S. Appl. No. 09/567,819, filed May 9, 2000.

\* cited by examiner

WIRELESS COMMUNICATION SYSTEM WITH CONFIGURABLE CYCLIC PREFIX LENGTH

CLAIM OF PRIORITY UNDER 35 U.S.C. §119

The present Application for Patent claims priority to Provisional Application Ser. No. 60/577,083, entitled "FLO-TDD physical layer," filed Jun. 4, 2004, assigned to the assignee hereof, and expressly incorporated herein by reference.

BACKGROUND

I. Field

The present invention relates generally to communication, and more specifically to techniques for transmitting data in a wireless communication system.

II. Background

Wireless communication systems are widely deployed to provide various communication services such as voice, packet data, multi-media broadcast, text messaging, and so on. These systems may utilize orthogonal frequency division multiplexing (OFDM), which is a multi-carrier modulation technique that can provide good performance in many wireless environments. OFDM partitions the overall system bandwidth into multiple (S) orthogonal frequency subbands. These subbands are also called tones, subcarriers, bins, and frequency channels. With OFDM, each subband is associated with a respective carrier that may be modulated with data. Up to S modulation symbols may be sent on the S subbands in each OFDM symbol period. Prior to transmission, the modulation symbols are transformed to the time-domain with an S-point inverse fast Fourier transform (IFFT) to generate a transformed symbol that contains S time-domain samples.

A key attribute of OFDM is the ability to combat delay spread, which is a prevalent phenomenon in a terrestrial communication system. The delay spread of a wireless channel is the time span or duration of an impulse response for the wireless channel. This delay spread is also the difference between the earliest and latest arriving signal instances (or multipaths) at a receiver for a signal transmitted via the wireless channel by a transmitter. These signal instances may have traveled via a direct/line-of-sight path and indirect/reflected paths formed by obstructions in the environment. The received signal at the receiver is a superposition of all of the arriving signal instances.

Delay spread causes intersymbol interference (ISI), which is a phenomenon whereby each symbol in the received signal acts as distortion to one or more subsequent symbols in the received signal. The ISI distortion degrades performance by impacting the receiver's ability to correctly detect the received symbols. Delay spread can be conveniently combated with OFDM by repeating a portion of each transformed symbol to form an OFDM symbol. The repeated portion is called a cyclic prefix or a guard interval. The cyclic prefix length is equal to the number of samples that is repeated for each transformed symbol.

The cyclic prefix length determines the amount of delay spread that can be combated with OFDM. A longer cyclic prefix length can combat more delay spread. The cyclic prefix length is typically set based on the maximum expected delay spread for a given percentage (e.g., 95%) of the receivers in the system. Since the cyclic prefix represents overhead for each OFDM symbol, it is desirable to have a cyclic prefix length that is as short as possible in order to reduce overhead.

There is therefore a need in the art for techniques to mitigate the deleterious effects of delay spread while reducing overhead.

SUMMARY

Techniques for transmitting data in a manner to mitigate the deleterious effects of delay spread are described herein. These techniques may be used for various types of transmissions (e.g., user-specific, multi-cast, and broadcast transmissions) and for various services (e.g., Enhanced Multimedia Broadcast/Multicast Service (E-MBMS)).

According to an embodiment of the invention, an apparatus is described which includes a controller and a modulator. The controller determines the expected coverage areas for multiple transmissions to be sent in multiple time slots and selects the cyclic prefix lengths for these transmissions based on the expected coverage areas. The modulator processes (e.g., OFDM modulates) the transmissions based on the selected cyclic prefix lengths.

According to another embodiment, a method is provided in which the expected coverage areas for multiple transmissions to be sent in multiple time slots are determined. The cyclic prefix lengths for these transmissions are selected based on the expected coverage areas. The transmissions are processed based on the selected cyclic prefix lengths.

According to yet another embodiment, an apparatus is described which includes means for determining the expected coverage areas for multiple transmissions to be sent in multiple time slots, means for selecting the cyclic prefix lengths for these transmissions based on the expected coverage areas, and means for processing the transmissions based on the selected cyclic prefix lengths.

According to yet another embodiment, a method is provided in which a cyclic prefix length is selected from among multiple cyclic prefix lengths for a data transmission based on the maximum expected delay spread for the data transmission. The data transmission is processed based on the selected cyclic prefix length.

According to yet another embodiment, an apparatus is described which includes a controller and a demodulator. The controller receives signaling for at least one cyclic prefix length selected for at least one transmission sent in at least one time slot. The at least one cyclic prefix length is selected based on the expected coverage area for the at least one transmission. The demodulator receives and processes (e.g., OFDM demodulates) the at least one transmission based on the at least one cyclic prefix length.

According to yet another embodiment, a method is provided in which signaling is received for at least one cyclic prefix length selected for at least one transmission sent in at least one time slot. The at least one transmission is processed based on the at least one cyclic prefix length.

According to yet another embodiment, an apparatus is described which includes means for receiving signaling for at least one cyclic prefix length selected for at least one transmission sent in at least one time slot, and means for processing the at least one transmission based on the at least one cyclic prefix length.

Various aspects and embodiments of the invention are described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The transmission techniques described herein may be used for wireless communication systems that utilize various radio technologies such OFDM, Interleaved FDMA (IFDMA) (which is also called Distributed FDMA), Localized FDMA (LFDMA) (which is also called Narrowband FDMA or Classical FDMA), W-CDMA, cdma2000, and other modulation techniques. OFDM, IFDMA, and LFDMA are multi-carrier radio technologies that effectively partition the overall system bandwidth into multiple (S) orthogonal frequency subbands. OFDM transmits modulation symbols in the frequency domain on all or a subset of the S subbands. IFDMA transmits modulation symbols in the time domain on subbands that are uniformly spaced across the S subbands. LFDMA transmits modulation symbols in the time domain and typically on adjacent subbands. The use of OFDM for unicast, multicast, and broadcast transmissions may also be considered as different radio technologies. The list of radio technologies given above is not exhaustive, and the transmission techniques may also be used for other radio technologies not mentioned above. For clarity, the transmission techniques are described below for OFDM.

Figure 1:
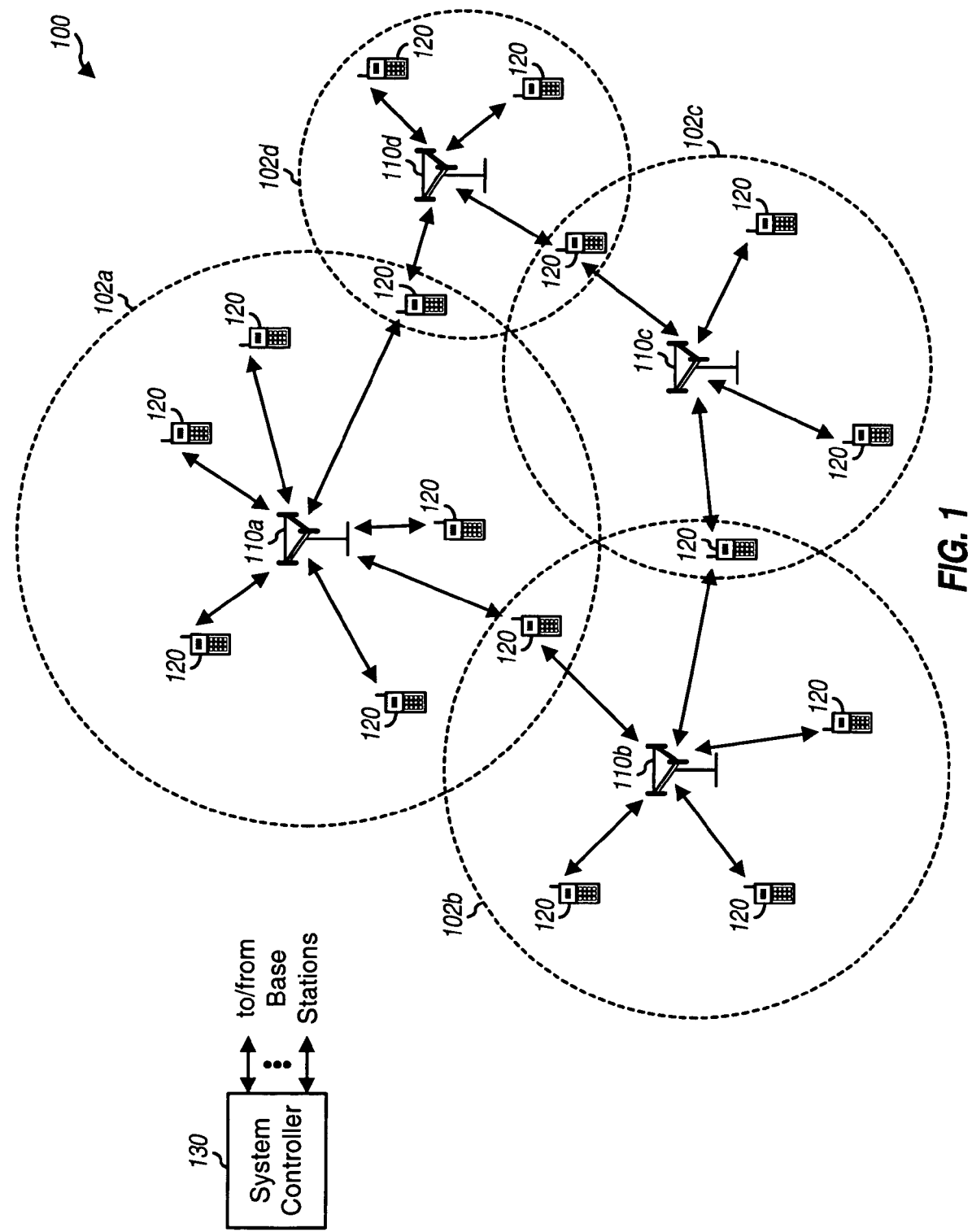
FIG. 1 shows a system with base stations having different coverage area sizes.

FIG. 1 shows a wireless communication system 100 with multiple base stations 110 and multiple terminals 120. For simplicity, only four base stations 110a through 110d are shown in FIG. 1. A base station is generally a fixed station that communicates with the terminals and may also be called an access point, a Node B, a base transceiver subsystem (BTS), or some other terminology. Each base station 110 provides communication coverage for a particular geographic area 102. The term "cell" can refer to a base station and/or its coverage area depending on the context in which the term is used. For simplicity, the coverage area of each base station is represented by an ideal circle in FIG. 1. In an actual system deployment, the coverage area of each base station typically has a shape that is different from an ideal circle and is dependent on various factors such as terrain, obstructions, and so on. The base station coverage areas may be the same or different sizes. For the example shown in FIG. 1, base station 110a has the largest coverage area 102a, base station 110b has the next largest coverage area 102b, base station 110c has the next largest coverage area 102c, and base station 110d has the smallest coverage area 102d among the four base stations shown in FIG. 1.

A terminal may be fixed or mobile and may also be called a mobile station, a wireless device, a user equipment, a user terminal, a subscriber unit, or some other terminology. A terminal may communicate with zero, one, or multiple base stations on the downlink and/or uplink at any given moment. The downlink (or forward link) refers to the communication link from the base stations to the terminals, and the uplink (or reverse link) refers to the communication link from the terminals to the base stations. The terminals may be dispersed throughout the base station coverage areas. Each terminal observes a different wireless channel that is dependent on the location of that terminal relative to the base stations in the system.

The base stations may broadcast various contents (e.g., audio, video, tele-text, data, video/audio clips, and so on) in different types of transmissions. A wide-area transmission is a transmission that is broadcast by all or many base stations in the system. Different wide-area transmissions may be broadcast by different groups of base stations in the system. A local transmission is a transmission that is broadcast by a subset of the base stations for a given wide-area transmission. Different local transmissions may be broadcast by different subsets of the base stations for the wide-area transmission. The local and wide-area transmissions may be viewed as transmissions having different tiers of coverage. The coverage area for each transmission is determined by all of the base stations broadcasting that transmission.

Figure 2:
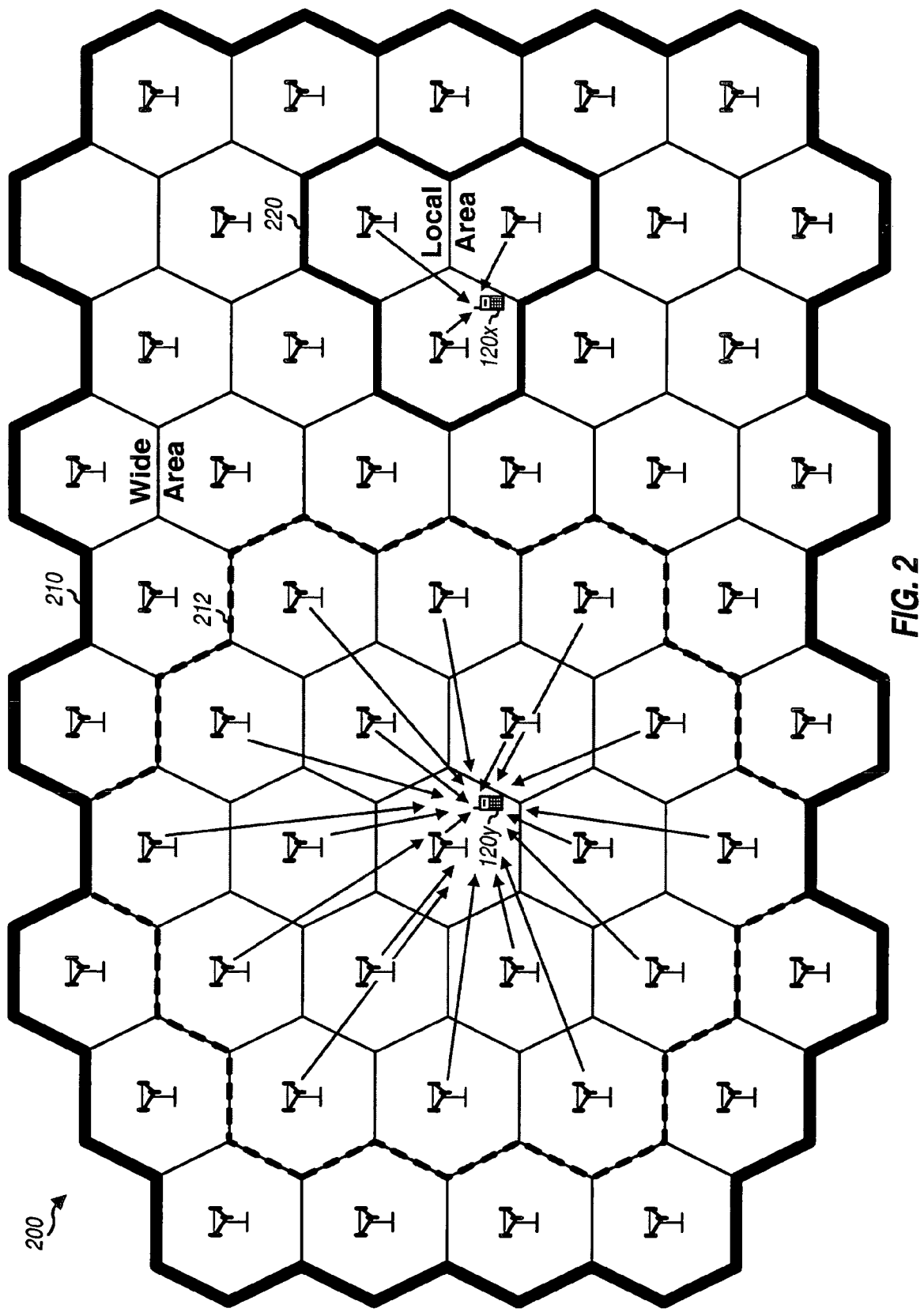
FIG. 2 shows a system with local and wide-area transmissions.

FIG. 2 shows a wireless communication system 200 with local and wide-area transmissions. System 200 includes a wide area 210 that encompasses a local area 220. Wide area and local area are simply different coverage areas within the system. In general, the system may include any number of wide areas and any number of local areas. A wide-area transmission for a given wide area is broadcast by all base stations within that wide area. A local transmission for a given local area is broadcast by all base stations within that local area.

For the example shown in FIG. 2, local area 220 has three base stations. A terminal 120x within local area 220 may receive the same local transmissions from all three base stations in this local area, as shown in FIG. 2. The received signal at terminal 120x is the superposition of all signal instances received from these three base stations via direct paths (as shown in FIG. 2) and indirect paths (not shown in FIG. 2). The wireless channel for terminal 120x for the local transmissions is composed of all direct and indirect paths for the three base stations in local area 220.

Wide-area area 210 has many more base stations than local area 220. For the example shown in FIG. 2, a terminal 120y within wide-area 210 receives the same wide-area transmissions from 19 base stations in a two-tier grid area 212, which is shown by grey shading within a dashed line. These 19 base stations include a center base station, six base stations in the first tier or ring around the center base station, and 12 base stations in the second tier around the center base station. The received signal at terminal 120y is the superposition of all signal instances received via direct and indirect paths from all of these 19 base stations. The wireless channel for terminal 120y for the wide-area transmissions is composed of all direct and indirect paths for the 19 base stations within area 212.

FIGS. 1 and 2 show two exemplary systems in which different terminals may observe different wireless channels due to different locations within the system, different base station coverage area sizes, and different types of transmissions. These different types of transmissions may include unicast transmissions sent to specific terminals, multicast transmissions sent to groups of terminals, and broadcast transmissions sent to all terminal within a broadcast coverage area. The terminals would observe different delay spreads.

The maximum expected delay spread for a given transmission is generally proportional to the size of the coverage area for that transmission. The maximum expected delay spread for a broadcast transmission is an upper limit delay spread for a given percentage of the terminals receiving that transmission. For example, 95% of all terminals receiving the broadcast transmission may have delay spreads that are less than or equal to the maximum expected delay spread. The maximum expected delay spread is generally smaller for a local transmission and larger for a wide-area transmission, as shown in FIG. 2.

The maximum expected delay spread for a user-specific transmission is an upper limit delay spread observed by a terminal receiving that transmission for a given percentage of realizations. For example, the terminal receiving the transmission may observe a delay spread that is less than or equal to the maximum expected delay spread for 95% of the time. For a user-specific transmission, the maximum expected delay spread is typically (but not necessarily) smaller for a base station with a small coverage area and larger for a base station with a large coverage area.

Configurable cyclic prefix length may be used to combat different maximum expected delay spreads for different types of transmissions (e.g., local and wide-area transmissions) and for different base station coverage area sizes. A shorter cyclic prefix length may be used for a transmission with a smaller maximum expected delay spread in order to reduce overhead for the cyclic prefix. This transmission may be a local transmission or a user-specific transmission with a smaller coverage area. Conversely, a longer cyclic prefix length may be used for a transmission with a larger maximum expected delay spread to allow a terminal to effectively combat intersymbol interference. This transmission may be a wide-area transmission or a user-specific transmission with a larger coverage area.

Figure 3:
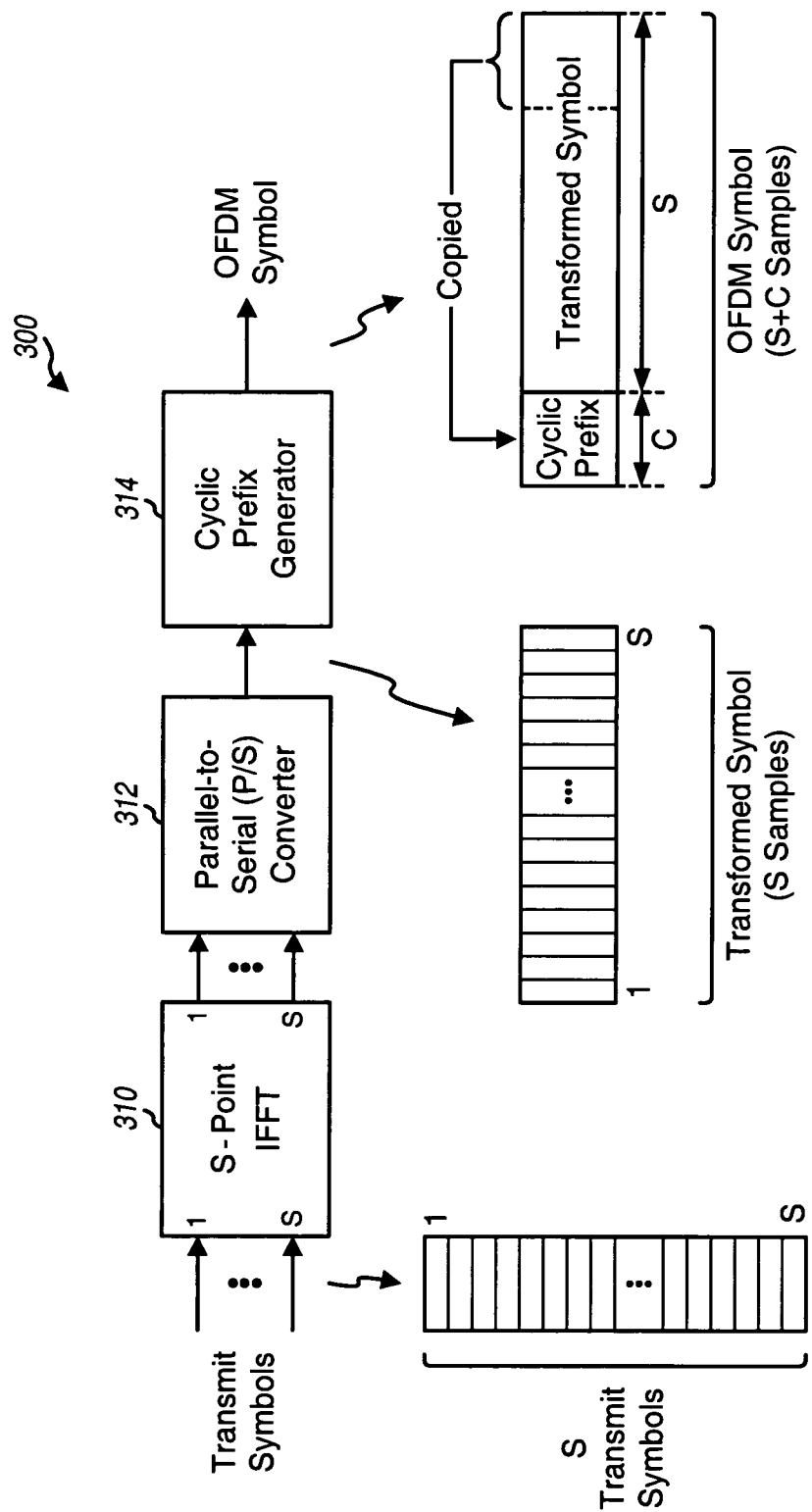
FIG. 3 shows an OFDM modulator.

FIG. 3 shows a block diagram of an OFDM modulator 300 for a transmitter in an OFDM-based system. The data to be transmitted is typically first encoded based on a coding scheme to generate code bits. The code bits are then mapped to modulation symbols based on a modulation scheme (e.g., M-PSK or M-QAM). Each modulation symbol is a complex value in a signal constellation for the modulation scheme.

In each OFDM symbol period, one modulation symbol may be sent on each subband used for transmission, and a zero symbol (which is a signal value of zero) is sent on each unused subband. The modulation symbols and zero symbols are referred to as transmit symbols. An IFFT unit 310 receives S transmit symbols for the S total subbands in each OFDM symbol period, transforms the S transmit symbols to the time domain with an S-point IFFT, and provides a transformed symbol that contains S time-domain samples. Each sample is a complex-value to be sent in one sample period. A parallel-to-serial (P/S) converter 312 serializes the S samples for each transformed symbol. A cyclic prefix generator 314 then repeats a portion (or C samples) of each transformed symbol to form an OFDM symbol that contains S+C samples. The cyclic prefix is used to combat intersymbol interference caused by delay spread. An OFDM symbol period (which is also simply called a symbol period) is the duration of one OFDM symbol and is equal to S+C sample periods.

A base station may transmit a pilot using frequency division multiplexing (FDM), time division multiplexing (TDM), code division multiplexing (CDM), and/or some other multiplexing scheme. For example, the base station may periodically transmit a TDM pilot that may be used for time synchronization, frequency error estimation, and so on. The base station may also transmit an FDM pilot that may be used for channel estimation. An FDM pilot is a pilot sent on P subbands that are distributed across the S total subbands, where S>P>1.

Figure 4A:
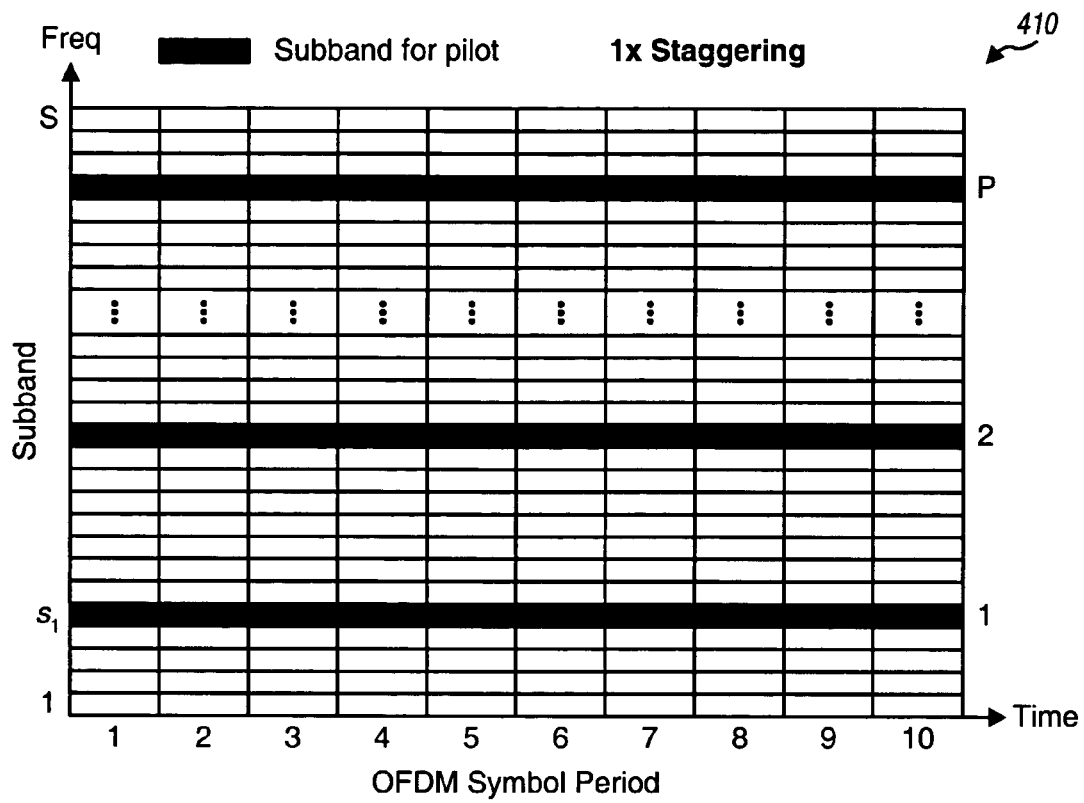
FIGS. 4A, 4B and 4C show pilots with 1×, 2× and 3× staggering, respectively.

FIG. 4A shows an exemplary FDM pilot transmission scheme 410 with 1× staggering. For 1× staggering scheme 410, the FDM pilot is transmitted on one set of P subbands. The P subbands in the set are uniformly distributed across the S total subbands such that consecutive subbands in the set are separated by a distance of D=S/P subbands. The set thus contains subbands $s_1$, $D+s_1$, $2D+s_1$, and so on, where the starting subband index $s_1$, may be any integer value between 1 and D. The FDM pilot is transmitted on the same set of P subbands in each OFDM symbol period in which the FDM pilot is transmitted.

Figure 4B:
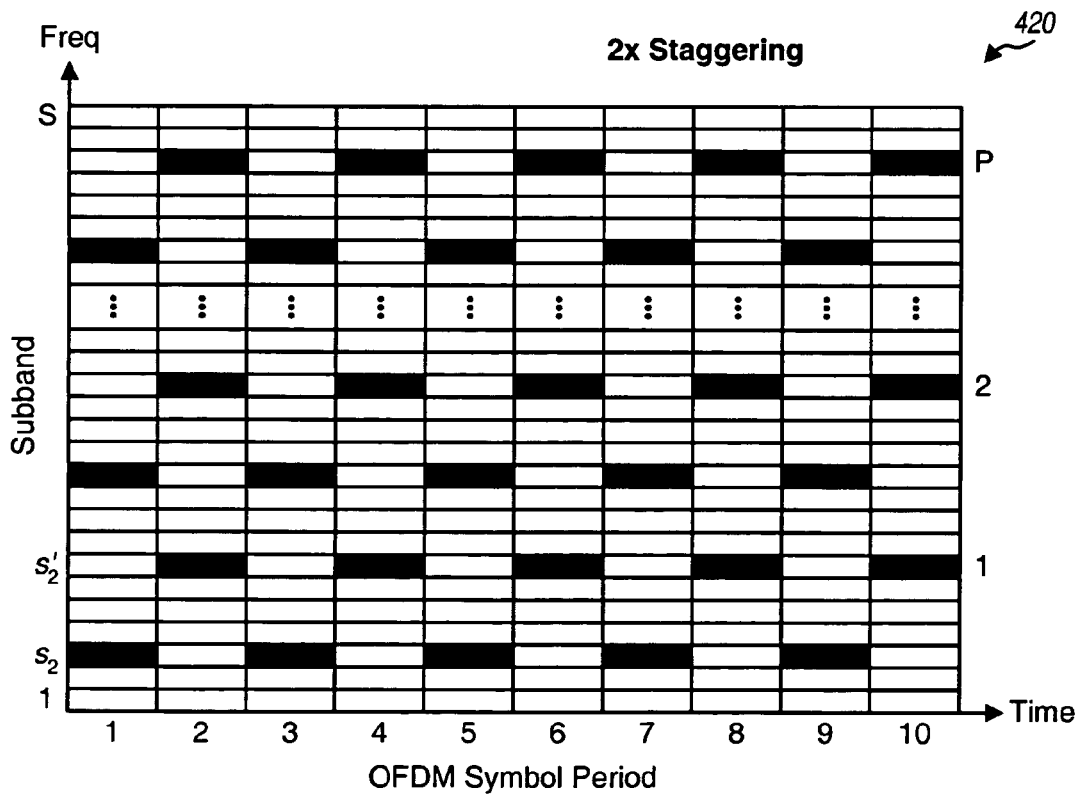

FIG. 4B shows an exemplary FDM pilot transmission scheme 420 with 2× staggering. For 2× staggering scheme 420, the FDM pilot is transmitted on two sets of P subbands. The P subbands in each set are uniformly distributed across the S total subbands. The P subbands in the first set are also offset from the P subbands in the second set by D/2 subbands. The first set contains subbands $s_2$, $D+s_2$, $2D+s_2$, and so on, and the second set contains subbands $s'_2$, $D+s'_2$, $2D+s'_2$, and so on. The starting subband index $s_2$ may be any integer value between 1 and D/2, and index $s'_2$ may be $s'_2=s_2+D/2$. The FDM pilot may be transmitted on the two subband sets in alternating symbol periods, e.g., on the first subband set in odd-numbered symbol periods and on the second subband set in even-numbered symbol periods.

Figure 4C:
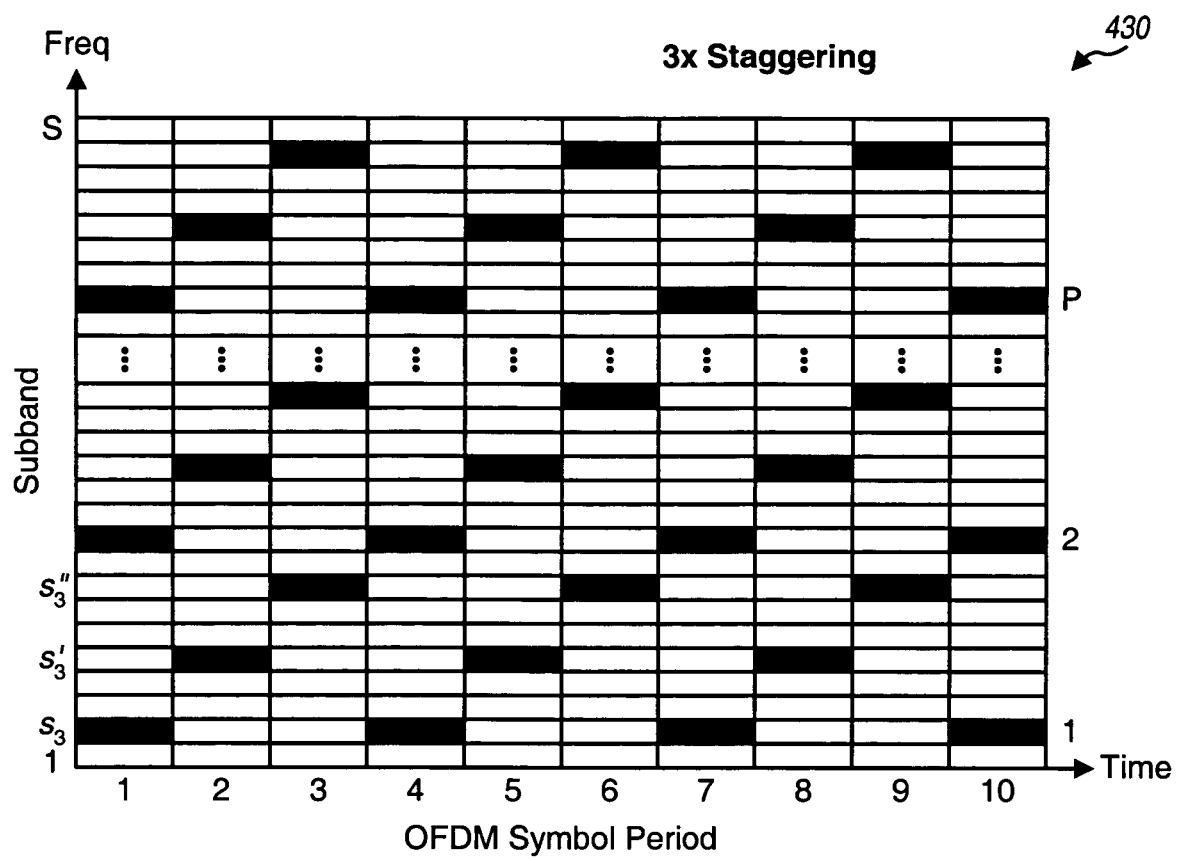

FIG. 4C shows an exemplary FDM pilot transmission scheme 430 with 3× staggering. For 3× staggering scheme 430, the FDM pilot is transmitted on three sets of P subbands. The P subbands in each set are uniformly distributed across the S total subbands. The P subbands in each set are also offset from the P subbands in each of the other two sets by approximately D/3 subbands. The first set contains subbands $s_3$, $D+s_3$, $2D+s_3$, and so on, the second set contains subbands $s'_3$, $D+s'_3$, $2D+s'_3$, and so on, and the third set contains subbands $s''_3$, $D+s''_3$, $2D+s''_3$, and so on. The starting subband index $s_3$ may be any integer value between 1 and [D/3], index $s'_3$ may be $s'_3=s_3+[D/3]$, and index $s''_3$ may be $s''_3=s_3+2\cdot[D/3]$, where [x] denotes a operator that provides an integer value that is equal to or greater than x. The FDM pilot may be cycled through the three subband sets, e.g., transmitted on the first subband set in symbol period n, then on the second subband set in symbol period n+1, then on the third subband set in symbol period n+2, then back on the first subband set in symbol period n+3, and so on.

FIGS. 4A through 4C show three exemplary staggered pilots. A staggered pilot sent on multiple subband sets (e.g., as shown in FIG. 4B or 4C) allows a terminal to (1) sample the system bandwidth on more subbands in the frequency domain and (2) derive a higher quality channel estimate. In general, the FDM pilot may be transmitted on any number of subband sets, and each set may contain any number of subbands. The FDM pilot may also be transmitted with various staggering patterns that indicate which subband to use for the FDM pilot in each symbol period. For example, the FDM pilot may be transmitted on four subband sets for 4× staggering, on D subband sets for complete staggering, and so on.

Figure 5:
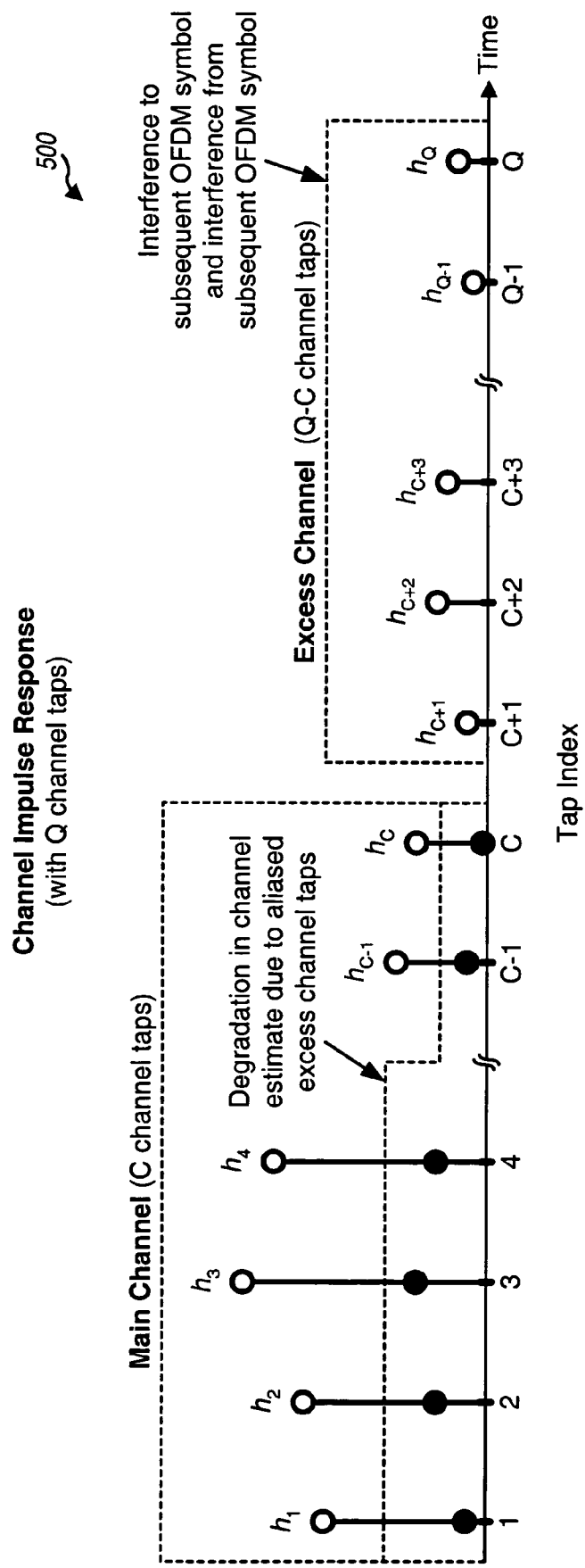
FIG. 5 shows a channel impulse response with excess delay spread.

FIG. 5 shows a channel impulse response 500 for a wireless channel with excess delay spread, which is a delay spread that is longer than the cyclic prefix length. The channel impulse response is composed of Q channel taps with indices of 1 through Q, where Q>C when excess delay spread is present. The first C channel taps are referred to as the main channel, and the remaining Q−C channel taps are referred to as the excess channel. A received OFDM symbol at a terminal is composed of the superposition of a transmitted OFDM symbol multiplied by each of the Q channel taps. A cyclic prefix of length C can capture all of the energy of channel taps 1 through C. This cyclic prefix does not capture the energy of channel taps C+1 through Q.

Excess delay spread causes intersymbol interference. Each OFDM symbol causes interference to a subsequent OFDM symbol due to the excess channel taps C+1 through Q. Each OFDM symbol also receives interference from a prior OFDM symbol due to the excess channel taps. Intersymbol interference may be mitigated by increasing the cyclic prefix length, e.g., to C=Q.

Excess delay spread also degrades channel estimation performance. If an FDM pilot is sent on P subbands, then a channel impulse response estimate with P channel taps may be obtained based on this FDM pilot. Typically, P is selected to be equal to C. In this case, excess channel taps C+1 through Q cannot be estimated because an insufficient number of degrees of freedom exists. Furthermore, the impulse response of the wireless channel is undersampled in the frequency domain by the P pilot subbands. This undersampling causes aliasing of the excess channel in the time domain so that excess channel tap C+1 appears on main channel tap 1, excess channel tap C+2 appears on main channel tap 2, and so on. Each aliased excess channel tap causes error in estimating the corresponding main channel tap. The degradation in channel estimation due to excess delay spread may be mitigated by transmitting the FDM pilot on more subbands using staggering. The length of the channel impulse response estimate (R) is dependent on the total number of subbands used for the FDM pilot, e.g., R=P for 1× staggering, R=2P for 2× staggering, and R=3P for 3× staggering. A staggered pilot allows for Nyquist sampling of the wireless channel even in the presence of excess delay spread and therefore avoids an aliased channel estimate. In general, more staggering allows a receiver to derive a longer channel impulse response estimate, which can reduce the amount of degradation in channel estimation.

The cyclic prefix length and pilot staggering may be selected based on various factors such as, e.g., system design parameters (e.g., the system bandwidth, the total number of subbands, and so on), the transmission types, the expected coverage areas for the transmissions, and so on. The cyclic prefix length and pilot staggering may also be selected based on various performance metrics. One such metric is a cumulative distribution function (CDF) of the ratio of "useful" received energy to thermal noise plus interference, which is also called signal-to-noise-and-interference ratio (SNR). The useful received energy is the sum of (1) the channel energy that falls within the cyclic prefix (CP) and (2) the channel energy that can be collected using a staggered pilot. The interference is the channel energy that falls outside of the cyclic prefix and that cannot be collected using the staggered pilot.

The SNRs for different staggered pilots may be expressed as:

$$SNR_{1x} = \frac{Rx \text{ Power Inside } CP}{N_0 + Rx \text{ Power Outside } CP}, \quad \text{Eq (1)}$$

$$SNR_{2x} = \frac{Rx \text{ Power Inside } CP + Rx \text{ Power Collected with } 2\times \text{Staggering}}{N_0 + Rx \text{ Power} - Rx \text{Power Inside } CP - Rx \text{ Power Collected with } 2\times \text{Staggering}},$$

$$SNR_{3x} = \frac{Rx \text{ Power Inside } CP + Rx \text{ Power Collected with } 3\times \text{Staggering}}{N_0 + Rx \text{ Power} - Rx \text{Power Inside } CP - Rx \text{ Power Collected with } 3\times \text{Staggering}},$$

$$SNR_{ideal} = \frac{Rx \text{ Power}}{N_0},$$

where $SNR_{1x}$, $SNR_{2x}$ and $SNR_{3x}$ are SNRs for 1×, 2× and 3× staggering, respectively;

$SNR_{ideal}$ is a best-case SNR with all of the received energy captured; and $N_0$ is noise power, which is assumed to be $N_0=2.16\times10^{-13}$ Watts.

In equation set (1), "Rx Power" is the total received power at the terminal. "Rx Power Inside CP" is the sum of the received power from a central base station plus the received powers from other base stations whose propagation delays to the terminal are less than the cyclic prefix. "Rx Power Outside CP" is the sum of the received powers from all base stations whose propagation delays to the terminal are greater than the cyclic prefix. "Rx Power Collected with 2× (or 3×) Staggering" is the sum of the received powers from all base stations collected with 2× (or 3×) staggered pilot. This collected power is based on an assumption that if the propagation delay from a given base station to the terminal is less than the staggering length (which is the product of the staggering factor and the cyclic prefix length), then all of the received energy for this base station can be collected. For example, the received power collected with 2× staggering may be expressed as:

$$Rx \text{ Power Collected with } 2\times \text{Staggering} = \sum_{BS(i)} Rx \text{ Power from } BS(i) \cdot \left(1 - \frac{\text{delay}(i) - CPL}{FFT \text{size}}\right)^2, \quad \text{Eq (2)}$$

where delay (i) is the propagation delay for base station i and CPL is the cyclic prefix length. The summation in equation (2) is over all base stations with propagation delays that are less than or equal to 2× staggering length, or twice the cyclic prefix length.

In equation set (1), $SNR_{1x}$, $SNR_{2x}$ $SNR_{3x}$ and $SNR_{ideal}$ are random variables that are functions of the location of a terminal within a system. These random variables may be evaluated by computer simulation for an exemplary system with a 19-cell 2-tier grid layout, e.g., as shown by shaded area 212 within wide-area 210 in FIG. 2. Table 1 lists some of the parameters used for the computer simulation.

TABLE 1

| Parameter | Symbol | | Value |
|---|---|---|---|
| Sample rate | $f_s$ | | 5.4 MHz |
| Sample period | $T_s$ | $T_s = 1/f_s$ | 185.19 ns |
| Total number of subbands | S | | 1024 |
| Number of guard subbands | G | | 136 |
| Number of usable subbands | U | $U = K - G$ | 888 |
| Number of pilot subbands | P | | 128 |
| Cyclic prefix length | C | | 108 samples |
| Cyclic prefix duration | $T_{cp}$ | $T_{cp} = C \cdot T_s$ | 20 μs |
| Window duration | $T_w$ | $T_w = W \cdot T_s$ | 4.074 μs |
| Total OFDM symbol duration | $T_{ofdm}$ | $T_{ofdm} = (S + C + W) \cdot T_s$ | 213.71 μs |

The computer simulation was performed for effective isotropic radiated power (EIRP) values of 2 kilo Watts (KW) and 10 kilo Watts, which correspond to transmit power of 53 dBm and 60 dBm, respectively, with 10 dB of transmit antenna gain. The computer simulation was also performed for different cell radii. The computer simulation was performed for cyclic prefix lengths of 108, 154, 194 and 237 samples, which correspond to 20 microseconds (μs), 29 μs, 36 μs and 44 μs, respectively, for the exemplary system shown in Table 1.

For each different combination of EIRP, cell radius, and cyclic prefix length, the computer simulation was performed for a large number of realizations at different locations with the coverage area of the central base station in the 2-tier layout. The shadowing is different for each realization and is determined based on a shadowing random variable. $SNR_{1x}$, $SNR_{2x}$, $SNR_{3x}$ and $SNR_{ideal}$ are determined for each realization. For simplicity, multipath is not taken into account in the computer simulation. The received power at the terminal from each base station is the power received via the direct path and is equal to the transmitted power from that base station minus propagation path loss, in units of decibels (dB). The total received power at the terminal is equal to the sum of the received powers for all base stations in the 2-tier layout. A CDF is obtained for each of the four random variables $SNR_{1x}$, $SNR_{2x}$, $SNR_{3x}$ and $SNR_{ideal}$ based on the SNR values obtained for all realizations for that random variable.

A performance metric of "95% coverage SNR" is used to quantify the performance of each random variable. A 95% coverage SNR of γ for a given random variable means that 95% of the realizations for this random variable achieve SNRs of γ or better. For example, the 95% coverage SNR for random variable $SNR_{ideal}$ may be expressed as:

$$Pr(SNR_{ideal} \geq SNR_{ideal}^{95\%}) = 0.95, \quad \text{Eq(3)}$$

where $SNR_{ideal}^{95\%}$ is the 95% coverage SNR for random variable $SNR_{ideal}$, and Pr (x) denotes the probability of x occurring.

The following observation can be made for the four random variables:

$$SNR_{1x}^{95\%} \leq SNR_{2x}^{95\%} \leq SNR_{3x}^{95\%} \leq SNR_{ideal}^{95\%} \quad \text{Eq (4)}$$

The differences in the 95% coverage SNRs for the four random variables indicate (1) whether a given cyclic prefix is sufficiently long and (2) any improvements achieved through pilot staggering.

FIGS. 6A through 6E show the results of the computer simulation. One figure is provided for each different combination of EIRP and cell radius that was simulated. Each figure includes four stacked bar charts for four different cyclic prefix lengths. Each stacked bar chart shows the 95% coverage SNRs for three random variables $SNR_{1x}$, $SNR_{2x}$, and $SNR_{3x}$ for a specific combination of EIRP, cell radius, and cyclic prefix length. For each stacked bar chart, the 95% coverage SNR for random variable $SNR_{1x}$ (which is $SNR_{1x}^{95\%}$) is the SNR value corresponding to the top of a box with cross hashing, the 95% coverage SNR for random variable $SNR_{2x}$ (which is $SNR_{2x}^{95\%}$) is the SNR value corresponding to the top of a box with black fill, and the 95% coverage SNR for random variable $SNR_{3x}$ (which is $SNR_{3x}^{95\%}$) is the SNR value corresponding to the top of a box with vertical hashing. For each figure, the maximum value for the vertical axis corresponds to $SNR_{ideal}^{95\%}$ which is the 95% coverage SNR if the cyclic prefix is long enough to capture all of the received energy.

For each stacked bar chart, the black filled box is not present if $SNR_{2x}^{95\%} = SNR_{1x}^{95\%}$, and the vertical hashed box is not present if $SNR_{3x}^{95\%} = SNR_{3x}^{95\%}$. The height of the black filled box indicates the amount of improvement achieved with 2× staggering over 1× staggering. The height of the vertical hashed box indicates the amount of improvement achieved with 3× staggering over 2× staggering. The combined height of the black filled box and the vertical hashed box indicates the amount of improvement achieved with 3× staggering over 1× staggering. A missing black filled box indicates no improvement with 2× staggering. A missing vertical hashed box indicates no improvement with 3× staggering. For a given pilot staggering, the improvement in SNR with longer cyclic prefix lengths is shown by the changes in the height of the boxes for that pilot staggering across the four stacked bar charts in a given figure. For example, the improvement in SNR with longer cyclic prefix lengths for 1× staggering is shown by the changes in the height of the cross hashed boxes across the four stacked bar charts.

Figure 6A:
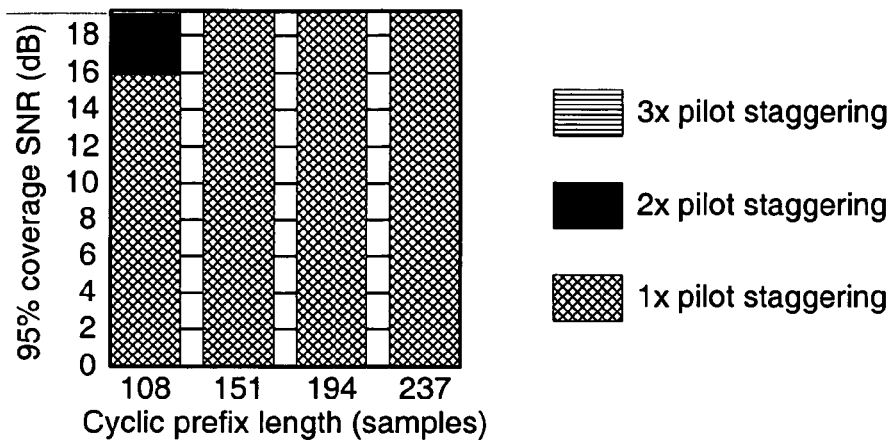
FIGS. 6A through 6E show 95% coverage SNRs for various EIRP values, cell radii, cyclic prefix lengths, and staggered pilots.
Figure 6B:
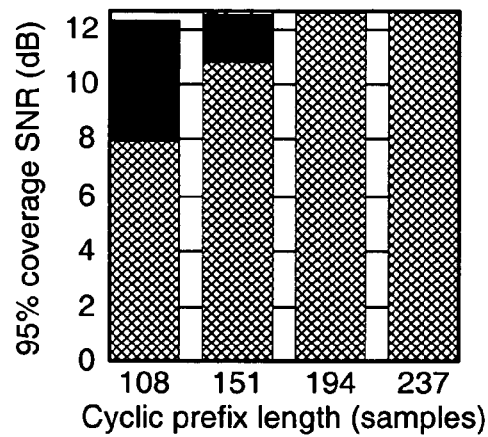
Figure 6C:
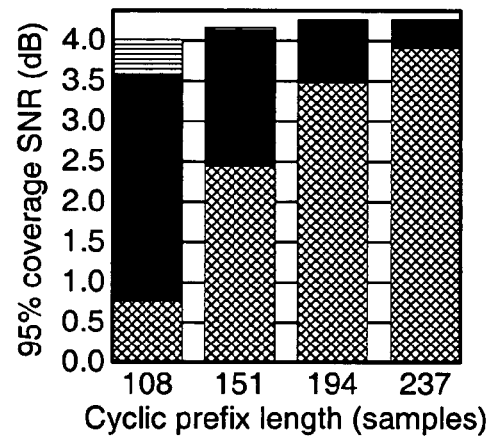

FIGS. 6A, 6B, and 6C show the 95% coverage SNRs for EIRP of 2 kilo Watts and cell radii of 2 kilometer (Km), 3 Km and 5 Km, respectively. The stacked bar charts in these figures indicate that (1) longer cyclic prefix lengths improve performance for cell radii of 4 Km and 5 Km and (2) 2× or 3× staggering should be used to approach $SNR_{ideal}^{95\%}$.

Figure 6D:
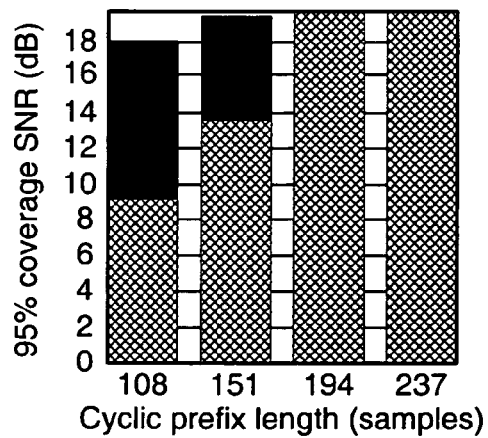
Figure 6E:
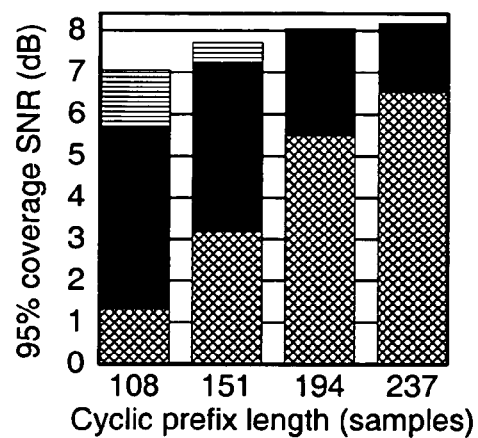

FIGS. 6D and 6E show the 95% coverage SNRs for EIRP of 10 kilo Watts and cell radii of 3 Km and 6 Km, respectively. The stacked bar charts in these figures indicate that (1) the cyclic prefix may be increased from about 108 samples (20 μs) to 151 samples (29 μs) at about 3 Km cell radius and (2) a cyclic prefix length of 108 samples has some loss relative to $SNR_{ideal}^{95\%}$ even with 3× staggering.

The simulation results shown in FIGS. 6A through 6E are for a specific system design, a specific propagation model, and a specific receiver design. Different results may be obtained for different designs and different models. In general, delay spread increases as cell radius increases, and a longer cyclic prefix length may be used for longer delay spread in order to improve SNR. Pilot staggering improves performance in many instances.

Figure 7:
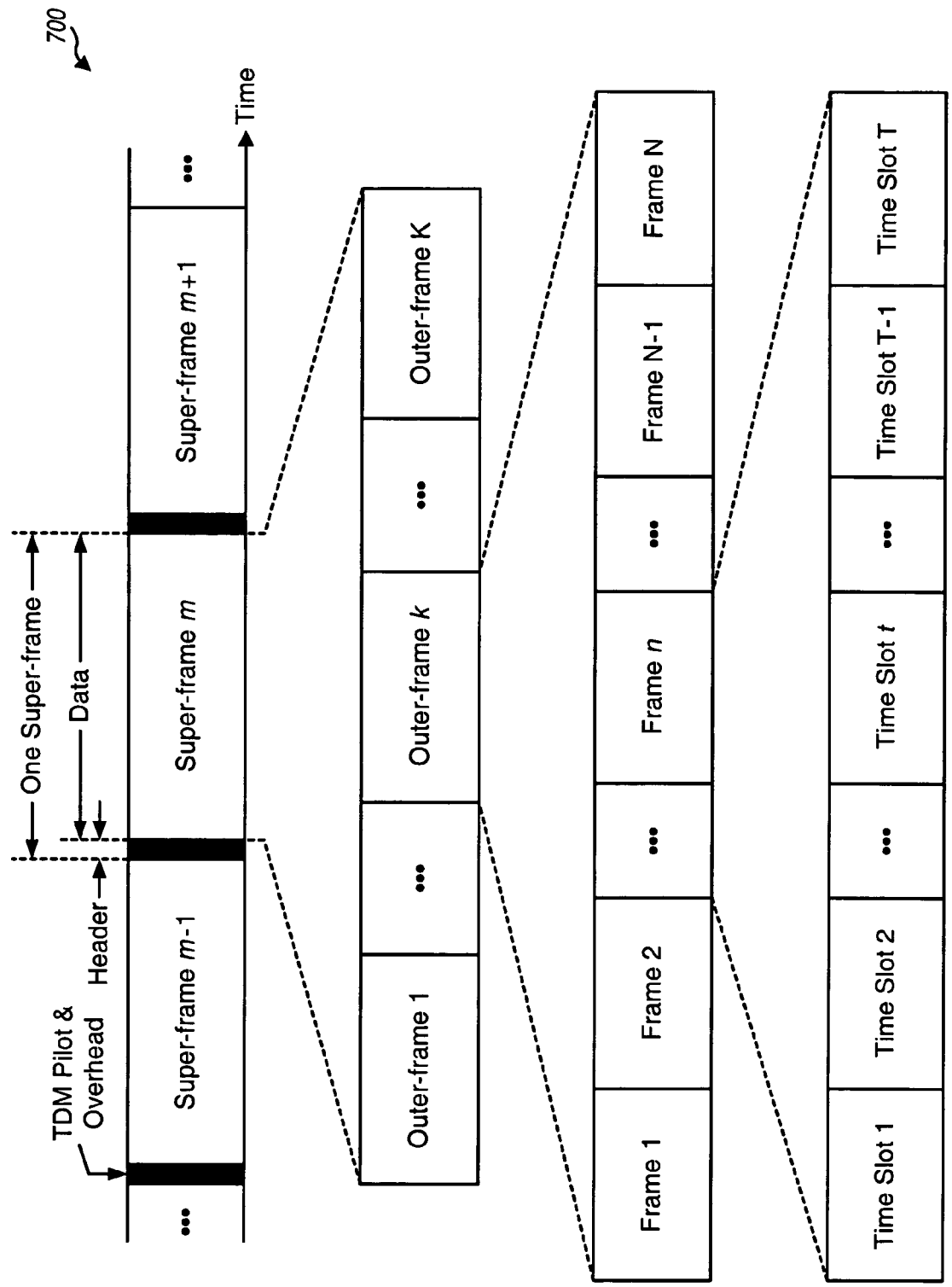
FIG. 7 shows a 3-tier super-frame structure for sending data, pilot, and overhead.

FIG. 7 shows an exemplary 4-tier super-frame structure 700 that may be used to send data, pilot, and overhead. The transmission time line is partitioned into super-frames, with each super-frame having a predetermined time duration, e.g., approximately one second. For the embodiment shown in FIG. 7, each super-frame includes (1) a header field for a TDM pilot and overhead/control information and (2) a data field for traffic data and FDM pilot. The TDM pilot may be used for synchronization (e.g., super-frame detection, frequency error estimation, and timing acquisition). The TDM and FDM pilots may be used for channel estimation. The overhead information for each super-frame may convey various parameters for the transmissions sent in that super-frame (e.g., the cyclic prefix lengths used for different transmissions such as local and wide-area transmissions). The data field of each super-frame is partitioned into K equal-size outer-frames to facilitate data transmission, where K>1. Each outer-frame is partitioned into N frames, and each frame is further partitioned into T time slots, where N>1 and T>1. The super-frame, outer-frame, frame, and time slot may also be referred to by some other terminology.

The transmission techniques described herein may also be used for systems that utilize multiple radio technologies. For example, these techniques may be used for a system that utilizes (1) a spread spectrum radio technology such as W-CDMA, cdma2000, or some other variation of Direct Sequence Code Division Multiple Access (DS-CDMA) for voice and packet data and (2) a multi-carrier radio technology such as OFDM for broadcast data.

Figure 8:
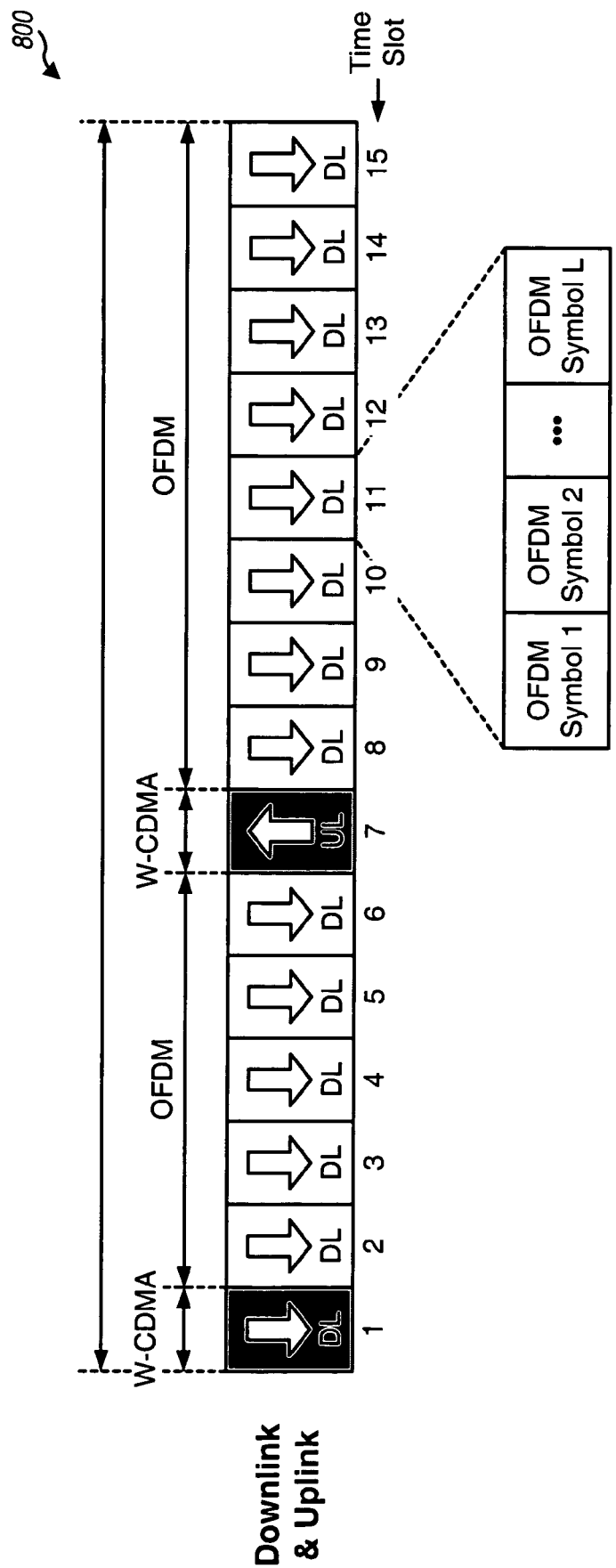
FIG. 8 shows a frame structure for a TDD system with W-CDMA and OFDM.

FIG. 8 shows an exemplary frame structure 800 for a time division duplexed (TDD) system that supports W-CDMA and OFDM. The transmission time line is partitioned into frames. Each frame has a duration of 10 milliseconds (ms) and is further partitioned into 15 time slots that are assigned indices of 1 through 15. Each time slot has a duration of 0.667 ms and includes 2560 chips. Each chip has a duration of 0.26 µs for a system bandwidth of 3.84 MHz.

For the example shown in FIG. 8, time slot 1 is used for a downlink W-CDMA slot, time slots 2 through 6 are used for downlink OFDM slots, time slot 7 is used for an uplink W-CDMA slot, and time slots 8 through 15 are used for downlink OFDM slots. For each W-CDMA slot, data for one or more physical channels may be channelized with different orthogonal (e.g., OVSF) sequences, spectrally spread with scrambling codes, combined in the time domain, and transmitted across the entire time slot. For each downlink OFDM slot, L OFDM symbols may be generated for the data to be sent in that time slot, where $L \geq 1$. For example, L=3 OFDM symbols may be sent in each downlink OFDM slot, and each OFDM symbol may be generated based on the design parameters shown in Table 1 and the selected cyclic prefix length.

For a frequency division duplexed (FDD) system that supports W-CDMA and OFDM, the downlink and uplink are transmitted simultaneously on separate frequency bands. Each time slot on the downlink may be used for W-CDMA or OFDM.

Frame structure 800 in FIG. 8 may be incorporated into super-frame structure 700 in FIG. 7. For example, each super-frame may include four outer-frames (K=4), each outer-frame may include 32 frames (N=32), and each frame may include 15 time slots (T=15). If each frame has a duration of 10 ms, then each outer-frame has a duration of 320 ms, and each super-frame has a duration of approximately 1.28 seconds.

FIGS. 7 and 8 show exemplary super-frame and frame structures. The techniques described herein may be used for other systems and super-frame and frame structures.

For each time slot used for broadcast, the coverage area for the transmission sent in that time slot is dependent on the number of neighboring base stations sending the same transmission. If many neighboring base stations send the same transmission, then the transmission may be considered as being for a single frequency network (SFN), a terminal can receive the transmission from many base stations, and the coverage area for the transmission will be large. Conversely, if one or few base stations send a given transmission, then the coverage area for the transmission will be small.

Configurable cyclic prefix length may be selected in various manners. In an embodiment, the cyclic prefix lengths for different transmissions are selected based on the expected coverage areas for these transmissions. The expected coverage area for a transmission is an area within which a terminal can receive that transmission at or above some minimum signal quality. The expected coverage area and the maximum expected delay spread are related, so that a larger expected coverage area corresponds to a larger maximum expected delay spread. A longer cyclic prefix length may be selected for (1) a broadcast transmission sent by many neighboring base stations or (2) a user-specific transmission sent by a base station with a large coverage area. The cyclic prefix lengths may be selected based on the available deployment information for the base stations in the system and scheduling information for the transmissions being sent. In another embodiment, the cyclic prefix length may be selected for each individual transmission based on the expected coverage area for that transmission. For all embodiments, the selected cyclic prefix lengths may be conveyed to the terminals via overhead signaling or some other means.

The configurable cyclic prefix lengths may be static, semi-static, or dynamic. The cyclic prefix lengths for local and wide-area transmissions may be static or semi-static, e.g., if these transmissions are sent on fixed or relatively static time slots. The cyclic prefix lengths may also be dynamically selected based on changes in the local and wide-area transmissions. For example, in each super-frame, the cyclic prefix length may be selected for each time slot in the super-frame based on the coverage area for the transmission sent in that time slot. A longer cyclic prefix length may be selected for each time slot with a transmission having a large coverage area. A shorter cyclic prefix length may be selected for each time slot with a transmission having a smaller coverage area.

A fixed or configurable staggered pilot may be used for the system. A fixed staggered pilot may be selected based on the system design and the expected operating conditions. A configurable staggered pilot may be selected from among multiple staggered pilots (e.g., 1×, 2×, 3×, and so on) based on the expected coverage areas or maximum expected delay spreads for the transmissions being sent. For example, less pilot staggering may be used for a local transmission with a smaller coverage area, and more pilot staggering may be used for a wide-area transmission with a larger coverage area.

Figure 9:
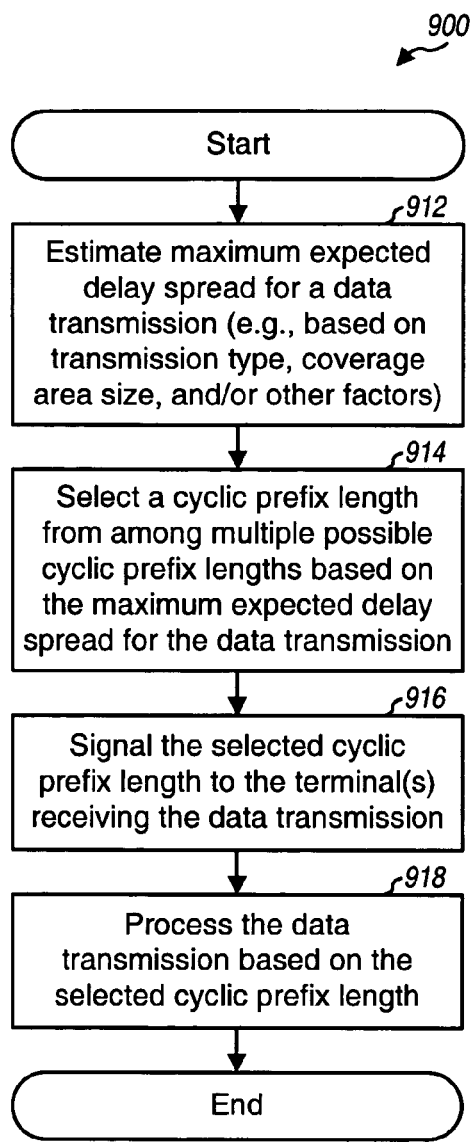
FIGS. 9 and 10 show two processes for transmitting data in a manner to mitigate the deleterious effects of delay spread.

FIG. 9 shows a process 900 for transmitting data in a manner to mitigate the deleterious effects of delay spread. Initially, the maximum expected delay spread for a data transmission is estimated based on the type of the data transmission, the size of the coverage area for the data transmission, and/or other factors (block 912). The data transmission may be a broadcast transmission, a user-specific transmission, or some other transmission. The transmission type may be local, wide-area, and so on.

A cyclic prefix length is selected from among multiple possible cyclic prefix lengths based on the maximum expected delay spread for the data transmission (block 914). For example, a shorter cyclic prefix length may be selected if the data transmission is a local transmission, and a longer cyclic prefix length may be selected if the data transmission is a wide-area transmission. A shorter cyclic prefix length may also be selected if the data transmission has a smaller coverage area, and a longer cyclic prefix length may be selected if the data transmission has a larger coverage area. The selected cyclic prefix length may be signaled to the terminal(s) receiving the data transmission (block 916). The data transmission is processed based on the selected cyclic prefix length (block 918). Each OFDM symbol generated for the data transmission includes a cyclic prefix of the selected length.

Figure 10:
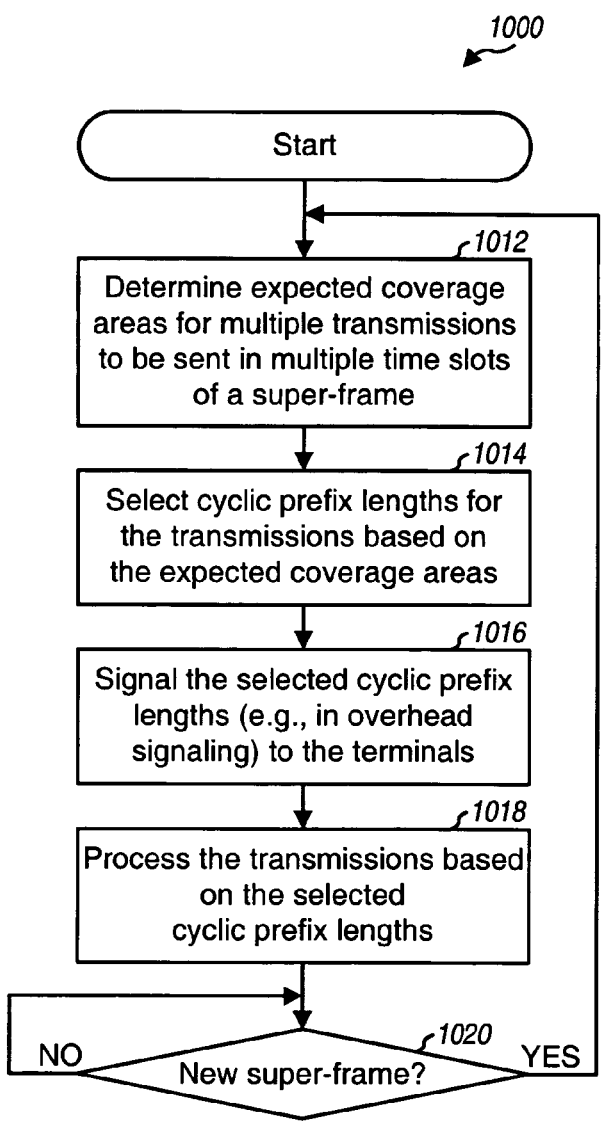

FIG. 10 shows a process 1000 for transmitting data in a manner to mitigate the deleterious effects of delay spread. Process 1000 may be used, e.g., in conjunction with the super-frame and frame structures shown in FIGS. 7 and 8.

Initially, the expected coverage areas for multiple transmissions to be sent in multiple time slots of a super-frame are determined (block 1012). The cyclic prefix lengths for these transmissions are selected based on the expected coverage areas (block 1014). The cyclic prefix length for each transmission may be selected from among a set of allowed cyclic prefix lengths based on the expected coverage area for that transmission, the pilot staggering used for the transmission, and so on. For example, a shorter cyclic prefix length may be selected for each local transmission, and a longer cyclic prefix length may be selected for each wide-area transmission. The selected cyclic prefix lengths may be signaled to the terminals, e.g., in the overhead portion of the super-frame (block 1016). The transmissions are processed based on the selected cyclic prefix lengths (block 1018). OFDM symbols are generated for each transmission based on the cyclic prefix length selected for that transmission.

Process 1000 may be performed periodically, e.g., in each super-frame. In this case, a determination is made whether a new super-frame has commenced (block 1020). If the answer is 'Yes', then the process returns to block 1012 to select the cyclic prefix lengths for the transmissions to be sent in the new super-frame. The cyclic prefix lengths may also be selected in time intervals other than each super-frame.

Figure 11:
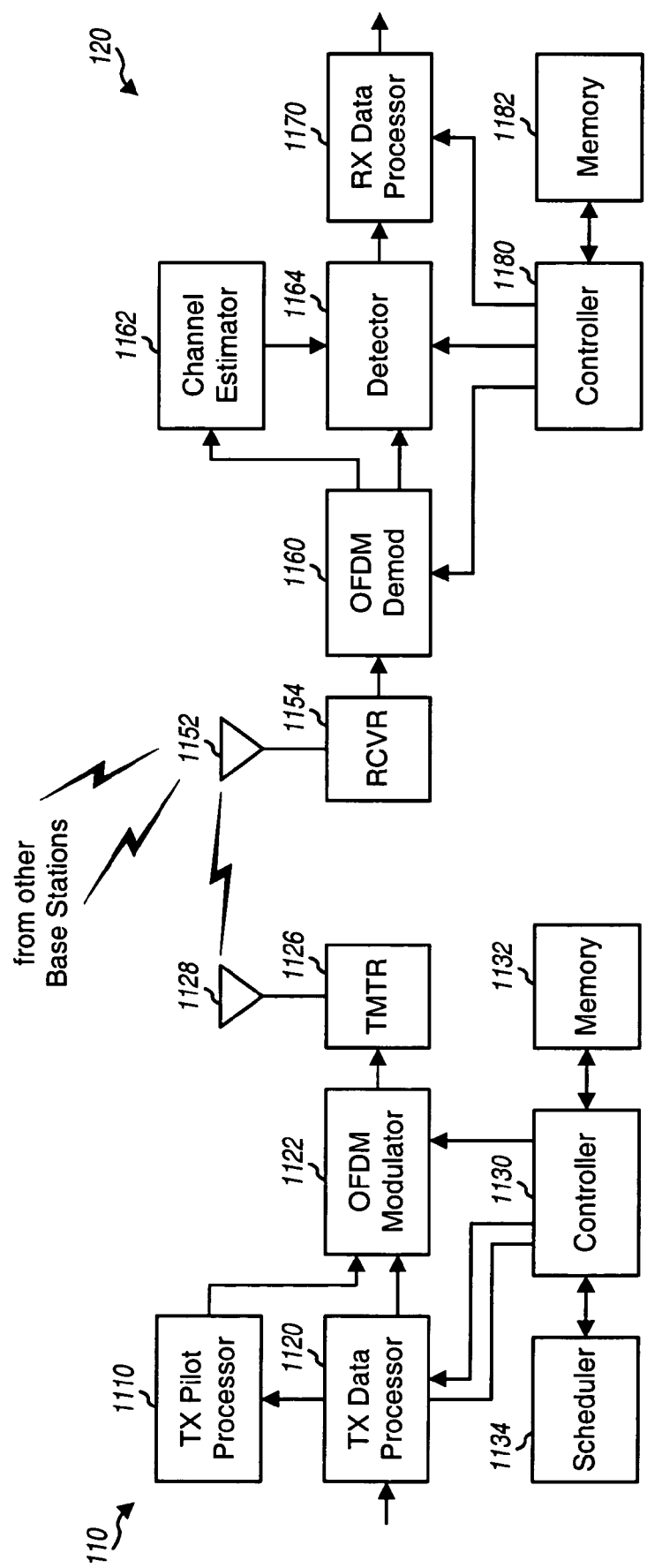
FIG. 11 shows a block diagram of a base station and a terminal.

FIG. 11 shows a block diagram of one base station 110 and one terminal 120. At base station 110, a transmit (TX) pilot processor 1110 generates a TDM pilot and an FDM pilot based on the selected pilot staggering. A TX data processor 1120 processes (e.g., encodes, interleaves, and symbol maps) traffic data and generates data symbols, which are modulation symbols for traffic data. An OFDM modulator 1122 performs OFDM modulation on the data and pilot symbols (e.g., as shown in FIG. 3) and generates OFDM symbols having the selected cyclic prefix lengths. A transmitter unit (TMTR) 1126 conditions (e.g., converts to analog, filters, amplifies, and frequency upconverts) the OFDM symbols and generates a modulated signal that is transmitted from an antenna 1128.

At terminal 120, an antenna 1152 receives the modulated signals transmitted by base station 110 and other base stations in the system. A receiver unit (RCVR) 1154 conditions, digitizes, and processes the received signal from antenna 1152 and provides a stream of input samples. An OFDM demodulator (Demod) 1160 performs OFDM demodulation on the input samples (e.g., complementary to the OFDM modulation shown in FIG. 3), provides received pilot symbols to a channel estimator 1162, and provides received data symbols to a detector 1164. Channel estimator 1162 derives a channel impulse response estimate and/or a channel frequency response estimate based on the received pilot symbols. Detector 1164 performs detection (e.g., equalization) on the received data symbols with the channel estimate from channel estimator 1162 and provides data symbol estimates, which are estimates of the transmitted data symbols. A receive (RX) data processor 1170 processes (e.g., symbol demaps, deinterleaves, and decodes) the data symbol estimates and provides decoded data. In general, the processing at terminal 120 is complementary to the processing at base station 110.

Controllers 1130 and 1180 direct the operation at base station 110 and terminal 120, respectively. Memory units 1132 and 1182 store program codes and data used by controllers 1130 and 1180, respectively. Controller 1130 and/or a scheduler 1134 schedules transmissions on the downlink and allocates system resources (e.g., time slots) to the scheduled transmissions.

The transmission techniques described herein may be used for transmissions on the downlink, as described above. These techniques may also be used for transmissions on the uplink.

The transmission techniques described herein may be implemented by various means. For example, these techniques may be implemented in hardware, software, or a combination thereof. For a hardware implementation, the processing units used to select configurable parameters (e.g., cyclic prefix length and/or pilot staggering) and the processing units used to process data for transmission may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units used to receive the transmission may also be implemented within one or more ASICs, DSPs, processors, electronic devices, and so on.

For a software implementation, the techniques may be implemented with modules (e.g., procedures, functions, and so on) that perform the functions described herein. The software codes may be stored in a memory unit (e.g., memory unit 1132 or 1182 in FIG. 11) and executed by a processor (e.g., controller 1130 or 1180). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
   a controller to determine expected coverage areas for a plurality of transmissions to be sent in a plurality of time slots, to select cyclic prefix lengths for the plurality of transmissions based on the expected coverage areas, and to select a staggered pilot from among a plurality of staggered pilots based on the expected coverage areas; and
   a modulator to process the plurality of transmissions based on the selected cyclic prefix lengths and to process the selected staggered pilot.

2. The apparatus of claim 1, wherein the controller determines the expected coverage areas and selects the cyclic prefix lengths in each time interval of a predetermined duration.

3. The apparatus of claim 1, wherein the controller selects a cyclic prefix length from among a plurality of cyclic prefix lengths for each of the plurality of transmissions based on an expected coverage area for the transmission.

4. The apparatus of claim 1, wherein the controller determines whether each of the plurality of transmissions is a local transmission or a wide-area transmission.

5. The apparatus of claim 4, wherein the controller selects a first cyclic prefix length for each local transmission among the plurality of transmissions and selects a second cyclic prefix length for each wide-area transmission among the plurality of transmissions, wherein the second cyclic prefix length is longer than the first cyclic prefix length.

6. The apparatus of claim 1, wherein the controller selects the cyclic prefix lengths for the plurality of transmissions further based on a frequency division multiplexed (FDM) pilot sent with the plurality of transmissions.

7. The apparatus of claim 1, wherein the modulator generates orthogonal frequency division multiplexing (OFDM) symbols for each of the plurality of transmissions based on a cyclic prefix length selected for the transmission.

8. A method of transmitting data in a wireless communication system, comprising:
   determining expected coverage areas for a plurality of transmissions to be sent in a plurality of time slots;
   selecting cyclic prefix lengths for the plurality of transmissions based on the expected coverage areas;
   selecting a staggered pilot from among a plurality of staggered pilots based on the expected coverage areas;
   processing the plurality of transmissions based on the selected cyclic prefix lengths; and
   processing the selected staggered pilot.

9. The method of claim 8, further comprising:
   performing the determining the expected coverage areas and the selecting the cyclic prefix lengths in each time interval of a predetermined duration.

10. The method of claim 8, wherein the selecting the cyclic prefix lengths for the plurality of transmissions comprises
   determining whether each of the plurality of transmissions is a local transmission or a wide-area transmission,
   selecting a first cyclic prefix length for each local transmission among the plurality of transmissions, and
   selecting a second cyclic prefix length for each wide-area transmission among the plurality of transmissions, wherein the second cyclic prefix length is longer than the first cyclic prefix length.

11. The method of claim 8, wherein the processing the plurality of transmissions based on the selected cyclic prefix lengths comprises
   generating orthogonal frequency division multiplexing (OFDM) symbols for each of the plurality of transmissions based on a cyclic prefix length selected for the transmission.

12. An apparatus comprising:
   means for determining expected coverage areas for a plurality of transmissions to be sent in a plurality of time slots;
   means for selecting cyclic prefix lengths for the plurality of transmissions based on the expected coverage areas;
   means for selecting a staggered pilot from among a plurality of staggered pilots based on the expected coverage areas;
   means for processing the plurality of transmissions based on the selected cyclic prefix lengths; and
   means for processing the selected staggered pilot.

13. The apparatus of claim 12, further comprising:
   means for determining the expected coverage areas and selecting the cyclic prefix lengths in each time interval of a predetermined duration.

14. The apparatus of claim 12, wherein the means for selecting the cyclic prefix lengths for the plurality of transmissions comprises
   means for determining whether each of the plurality of transmissions is a local transmission or a wide-area transmission,
   means for selecting a first cyclic prefix length for each local transmission among the plurality of transmissions, and
   means for selecting a second cyclic prefix length for each wide-area transmission among the plurality of transmissions, wherein the second cyclic prefix length is longer than the first cyclic prefix length.

15. The apparatus of claim 12, wherein the means for processing the plurality of transmissions based on the selected cyclic prefix lengths comprises
   means for generating orthogonal frequency division multiplexing (OFDM) symbols for each of the plurality of transmissions based on a cyclic prefix length selected for the transmission.

16. A method of transmitting data in a wireless communication system, comprising:
   selecting a cyclic prefix length for a data transmission from among a plurality of cyclic prefix lengths based on a maximum expected delay spread for the data transmission;
   selecting a staggered pilot from among a plurality of staggered pilots based on the maximum expected delay spread;
   processing the data transmission based on the selected cyclic prefix length; and
   processing the selected staggered pilot.

17. The method of claim 16, further comprising:
   estimating the maximum expected delay spread for the data transmission based on a type of the data transmission.

18. The method of claim 16, further comprising:
   estimating the maximum expected delay spread for the data transmission based on an expected coverage area for the data transmission.

19. The method of claim 16, wherein the selecting the cyclic prefix length comprises
   selecting a first cyclic prefix length from among the plurality of cyclic prefix lengths if the data transmission is a local transmission, and
   selecting a second cyclic prefix length from among the plurality of cyclic prefix lengths if the data transmission is a wide-area transmission, wherein the second cyclic prefix length is longer than the first cyclic prefix length.

20. The method of claim 16, wherein the processing the data transmission based on the selected cyclic prefix length comprises
   generating orthogonal frequency division multiplexing (OFDM) symbols for the data transmission based on the selected cyclic prefix length.

21. The method of claim 16, further comprising:
   broadcasting the data transmission to a plurality of receivers.

22. The method of claim 16, further comprising:
   sending the data transmission to a specific receiver.

23. An apparatus comprising:
   a controller to receive signaling for at least one cyclic prefix length selected for at least one transmission sent in at least one time slot, wherein the at least one cyclic prefix length is selected based on an expected coverage area for the at least one transmission;
   a demodulator to receive and process the at least one transmission based on the at least one cyclic prefix length;
   a channel estimator to receive a staggered pilot transmitted with the at least one transmission and to derive a channel estimate based on the received staggered pilot, wherein the staggered pilot is selected based on the expected coverage area for the at least one transmission; and a detector to perform detection on the at least one transmission with the channel estimate.

24. The apparatus of claim 23, wherein each of the at least one transmission is a local transmission or a wide-area transmission, wherein a first cyclic prefix length is selected for each local transmission, wherein a second cyclic prefix length is selected for each wide-area transmission, and wherein the second cyclic prefix length is longer than the first cyclic prefix length.

25. The apparatus of claim 23, wherein the controller receives the signaling for the at least one cyclic prefix length in each of a plurality of time intervals, each time interval having a predetermined duration.

26. The apparatus of claim 23, wherein the demodulator receives orthogonal frequency division multiplexing (OFDM) symbols for each of the at least one transmission and removes cyclic prefixes in the received OFDM symbols for each transmission based on a cyclic prefix length selected for the transmission.

27. A method of receiving data in a wireless communication system, comprising:

receiving signaling for at least one cyclic prefix length selected for at least one transmission sent in at least one time slot, wherein the at least one cyclic prefix length is selected based on an expected coverage area for the at least one transmission;

processing the at least one transmission based on the at least one cyclic prefix length;

receiving a staggered pilot transmitted with the at least one transmission, wherein the staggered pilot is selected based on the expected coverage area for the at least one transmission;

deriving a channel estimate based on the received staggered pilot; and performing detection on the at least one transmission with the channel estimate.

28. The method of claim 27, further comprising:

performing the receiving the signaling for the at least one cyclic prefix length and the processing the at least one transmission in each of a plurality of time intervals, each time interval having a predetermined duration.

29. The method of claim 27, wherein the processing the at least one transmission comprises receiving orthogonal frequency division multiplexing (OFDM) symbols for each of the at least one transmission, and removing cyclic prefixes in the received OFDM symbols for each transmission based on a cyclic prefix length selected for the transmission.

30. An apparatus comprising:

means for receiving signaling for at least one cyclic prefix length selected for at least one transmission sent in at least one time slot, wherein the at least one cyclic prefix length is selected based on expected coverage area for the at least one transmission;

means for processing the at least one transmission based on the at least one cyclic prefix length;

means for receiving a staggered pilot transmitted with the at least one transmission, wherein the staggered pilot is selected based on the expected coverage area for the at least one transmission;

means for deriving a channel estimate based on the received staggered pilot; and means for performing detection on the at least one transmission with the channel estimate.

31. The apparatus of claim 30, further comprising:

means for receiving the signaling for the at least one cyclic prefix length and for processing the at least one transmission in each of a plurality of time intervals, each time interval having a predetermined duration.

32. The apparatus of claim 30, wherein the means for processing the at least one transmission comprises means for receiving orthogonal frequency division multiplexing (OFDM) symbols for each of the at least one transmission, and means for removing cyclic prefixes in the received OFDM symbols for each transmission based on a cyclic prefix length selected for the transmission.

33. A computer-program product for transmitting data in a wireless communication system, the computer-program product comprising a computer-readable medium having instructions thereon, the instructions comprising:

code for determining expected coverage areas for a plurality of transmissions to be sent in a plurality of time slots;

code for selecting cyclic prefix lengths for the plurality of transmissions based on the expected coverage areas;

code for selecting a staggered pilot from among a plurality of staggered pilots based on the expected coverage areas;

code for processing the plurality of transmissions based on the selected cyclic prefix lengths; and code for processing the selected staggered pilot.

* * * * *